(12) United States Patent
Gerber

(10) Patent No.: US 7,848,085 B2
(45) Date of Patent: Dec. 7, 2010

(54) PORTABLE POWER DISTRIBUTION PANEL

(76) Inventor: Martin Gerber, 13700 Marina Point Dr., App. 1716, Marina del Rey, CA (US) 90292

(*) Notice: Subject to any disclaimer, the term of this patent is extended or adjusted under 35 U.S.C. 154(b) by 0 days.

(21) Appl. No.: 12/272,564

(22) Filed: Nov. 17, 2008

(65) Prior Publication Data

US 2010/0123997 A1 May 20, 2010

(51) Int. Cl.
*H02B 1/52* (2006.01)

(52) U.S. Cl. .................. 361/625; 361/644; 361/647; 174/50.52; 312/223.2; 312/265.4

(58) Field of Classification Search ......... 361/600–602, 361/622–627, 647, 663–665, 644, 42, 634, 361/807–809, 826–831; 312/108, 111, 140, 312/223.2, 223.3, 235, 236, 265.3, 265.4, 312/265.5, 351.11, 257, 257.1; D14/123, D14/124, 110; 320/103, 111, 116; 211/26, 211/181–183, 189, 191; 174/50, 50.52, 35 R, 174/520

See application file for complete search history.

(56) References Cited

U.S. PATENT DOCUMENTS

| | | | | |
|---|---|---|---|---|
| 2,995,670 A * | 8/1961 | Weiss | .......................... | 307/112 |
| 3,586,915 A * | 6/1971 | Urquhart et al. | ............. | 361/697 |
| 3,631,324 A * | 12/1971 | Jones | .......................... | 361/625 |
| 3,836,043 A * | 9/1974 | Levin | .......................... | 205/504 |
| 3,901,571 A * | 8/1975 | Begitschke et al. | ....... | 312/265.4 |
| 4,123,129 A * | 10/1978 | Butler | ...................... | 312/265.3 |
| 4,213,532 A * | 7/1980 | Eggert et al. | ................. | 206/504 |
| 4,318,156 A * | 3/1982 | Gallagher | ................... | 361/647 |
| 4,322,572 A * | 3/1982 | Snyder | ........................ | 174/368 |
| 4,390,926 A * | 6/1983 | Hart | ............................ | 361/625 |
| 4,484,715 A * | 11/1984 | DeMarco et al. | ......... | 242/613.5 |
| 4,669,616 A * | 6/1987 | Mazura | .................... | 211/41.17 |
| 4,958,259 A * | 9/1990 | Berg et al. | .................... | 361/730 |
| 5,035,630 A * | 7/1991 | Norsworthy | ................. | 439/92 |
| 5,070,429 A * | 12/1991 | Skirpan | ...................... | 361/644 |
| 5,202,538 A | 4/1993 | Skirpan | | |
| 5,212,623 A * | 5/1993 | Wilson et al. | ............... | 361/625 |
| 5,544,003 A | 8/1996 | Vaughan | | |
| 5,574,622 A * | 11/1996 | Brown | ........................ | 361/625 |
| 5,695,263 A * | 12/1997 | Simon et al. | ............. | 312/265.4 |
| 5,735,407 A * | 4/1998 | Kallio | ......................... | 206/707 |
| 6,120,116 A * | 9/2000 | Phillips | .................... | 312/223.2 |
| 6,724,633 B1 * | 4/2004 | Wu | ............................. | 361/726 |
| 6,894,439 B2 * | 5/2005 | Stewart et al. | ............ | 315/241 P |
| 6,947,287 B1 * | 9/2005 | Zansky et al. | ................ | 361/731 |
| 7,413,027 B2 * | 8/2008 | Glaser et al. | ................ | 173/115 |
| 7,511,451 B2 * | 3/2009 | Pierce | ......................... | 320/103 |
| 2008/0316699 A1 * | 12/2008 | Chen et al. | ................... | 361/686 |
| 2009/0284109 A1 * | 11/2009 | Lee | ........................... | 312/223.2 |

* cited by examiner

*Primary Examiner*—Michael V Datskovskiy
(74) *Attorney, Agent, or Firm*—Muncy, Geissler, Olds & Lowe, PLLC

(57) ABSTRACT

A power distribution system is provided that includes an upper panel, a lower panel, a plurality of side panels, and a plurality of guide rails each having at least two insert slots formed therein that extend along a longitudinal axis of the guide rail. Each of the insert slots is configured to receive and fixedly hold an edge of the side panels. The upper panel and lower panel are each fixedly mounted to an opposite edge face of the guide rails thereby securing the side panels and guide rail between the upper panel and lower panel.

18 Claims, 7 Drawing Sheets

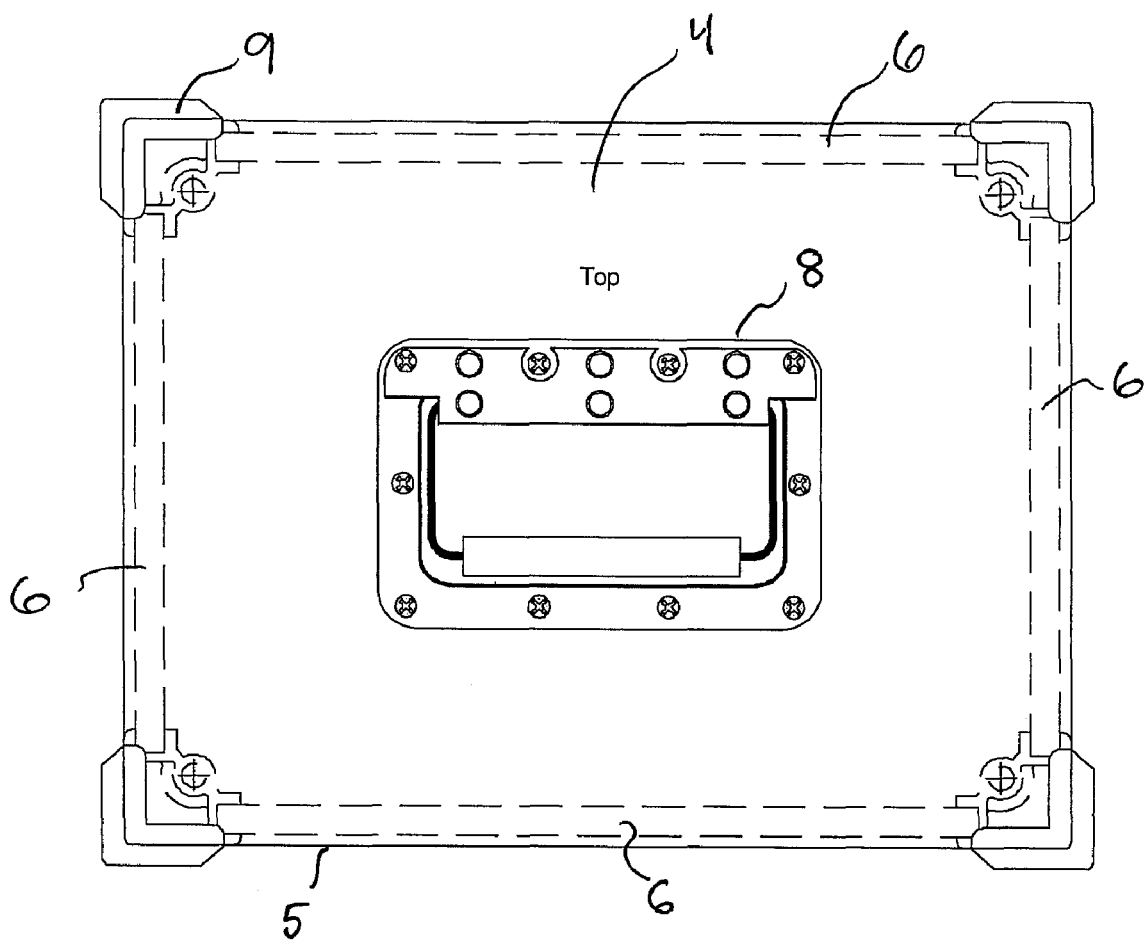

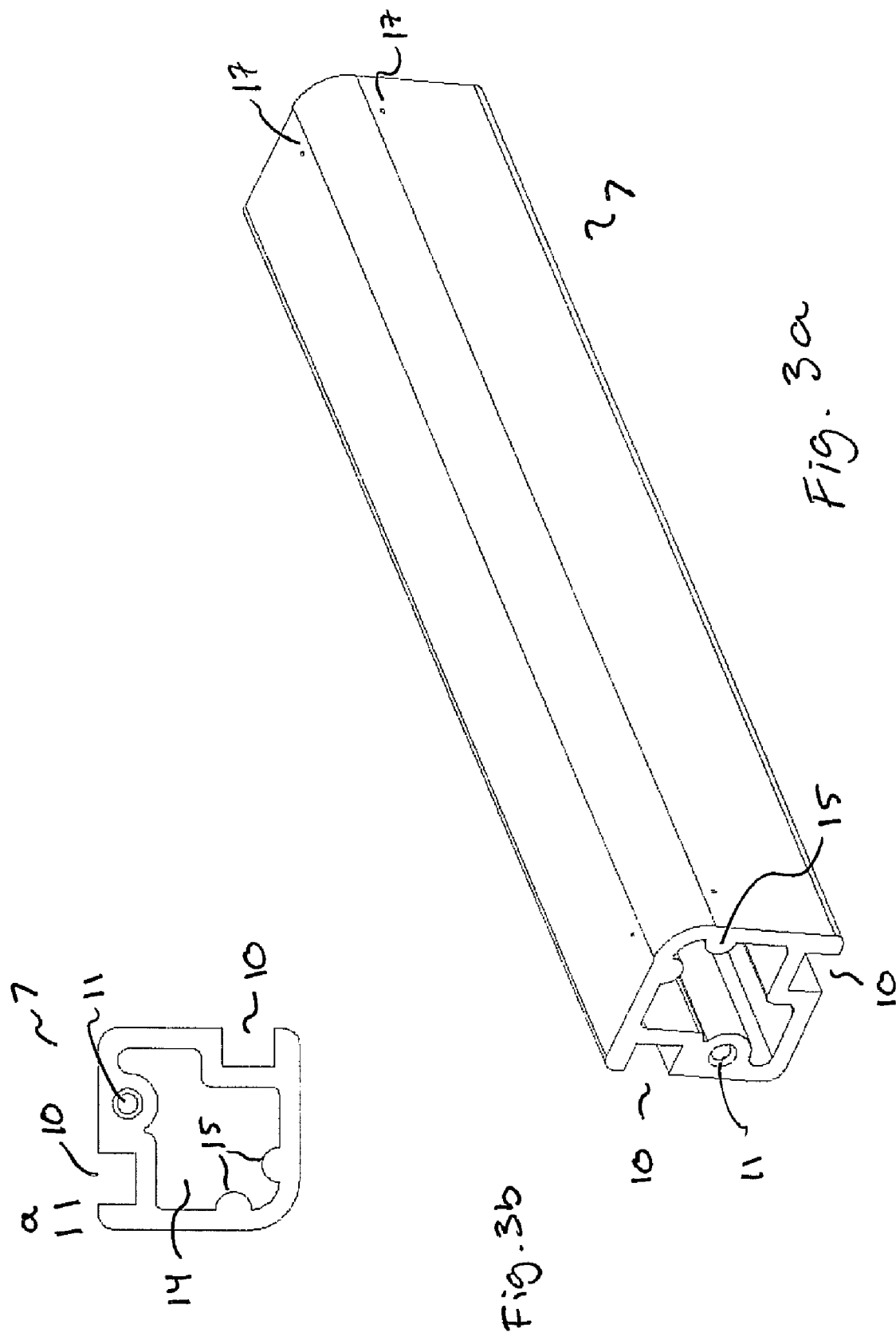

PORTABLE POWER DISTRIBUTION PANEL

BACKGROUND OF THE INVENTION

1. Field of the Invention

The present invention relates to portable power distribution equipment.

2. Description of the Background Art

Power distribution systems are used to distribute voltages for various applications. Conventional power distribution systems typically include a number of different circuit elements such as circuit breakers, input and output connectors, LED's, etc. These circuit elements are typically enclosed within a housing structure for safety and other reasons. The housing structure is then fixedly mounted in a building structure or at a specific outdoor location.

There are, however, various sites and locations that require electric power and yet do not have fixed electric power distribution systems, for example, in the motion picture industry, convention and exhibit halls, indoor & outdoor events, and special events.

U.S. Pat. No. 5,544,003 describes a portable power distribution panel. The distribution panel therein is mounted on a frame that includes roller casters for portability. This panel, however, has limited mobility and is cumbersome to transport, for example, on stairs or over rugged terrain.

U.S. Pat. No. 5,202,538 describes a portable electric power distribution cabinet that has a pair of end frames assembled to one another by four corner rails. Enclosure panels are mounted to the end frame and to the corner rails and are secured thereto by a plurality of threaded screws. However, in order to change the panels it is very laborious due to the plurality of screws. In addition, the screws that are utilized to mount the panels to the corner rails protrude into the interior of the cabinet and may cause damage to interior components, such as wiring. In the event that a panel is replaced, there is a greater risk of damage or injury if, for example, an improperly sized screw is used.

Thus, there are many locations that require portable power distribution and therefore there is a need for a power distribution panel that can be easily transported and that can be easily and safely configured.

SUMMARY OF THE INVENTION

It is therefore an object of the present invention to provide a power distribution panel that is easily transported and is safely and easily configured to various configurations.

In an embodiment, the power distribution panel includes an upper panel, a lower panel, a plurality of side panels, and a plurality of guide rails each having at least two insert slots formed therein that extend along a longitudinal axis of the guide rail. Each of the insert slots is configured to receive and fixedly hold an edge of the side panels. The upper panel and lower panel are each fixedly mounted to an opposite edge face of the guide rails thereby securing the side panels and guide rail between the upper panel and lower panel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 2a-f show side views of each side of the power distribution box;

FIGS. 3a-b illustrate a guide rail according to an embodiment of the present invention.

DETAILED DESCRIPTION

Figure 1A:
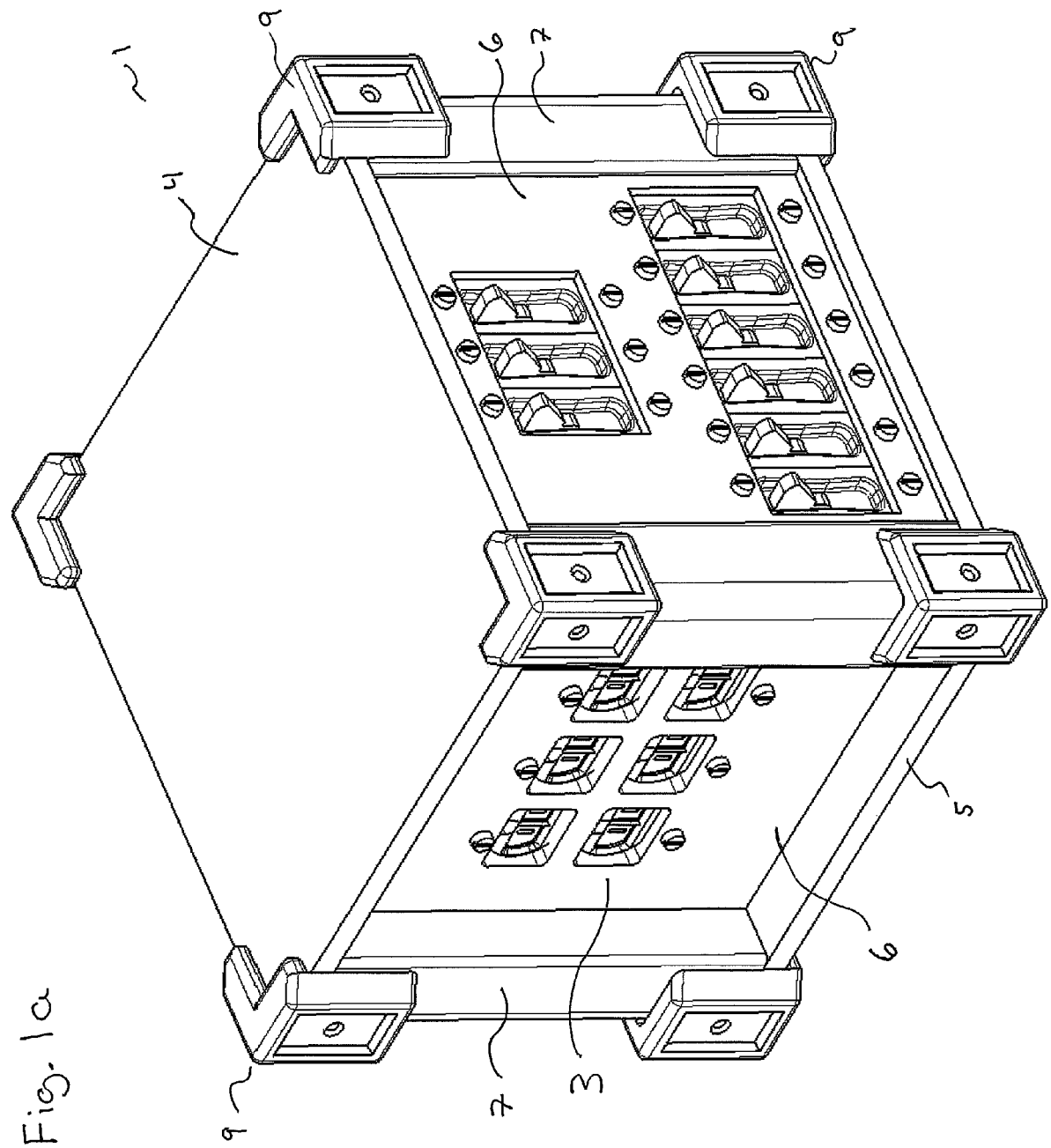
FIGS. 1a-c are perspective illustrations of a power distribution box according to exemplary embodiments of the present invention.
Figure 1B:
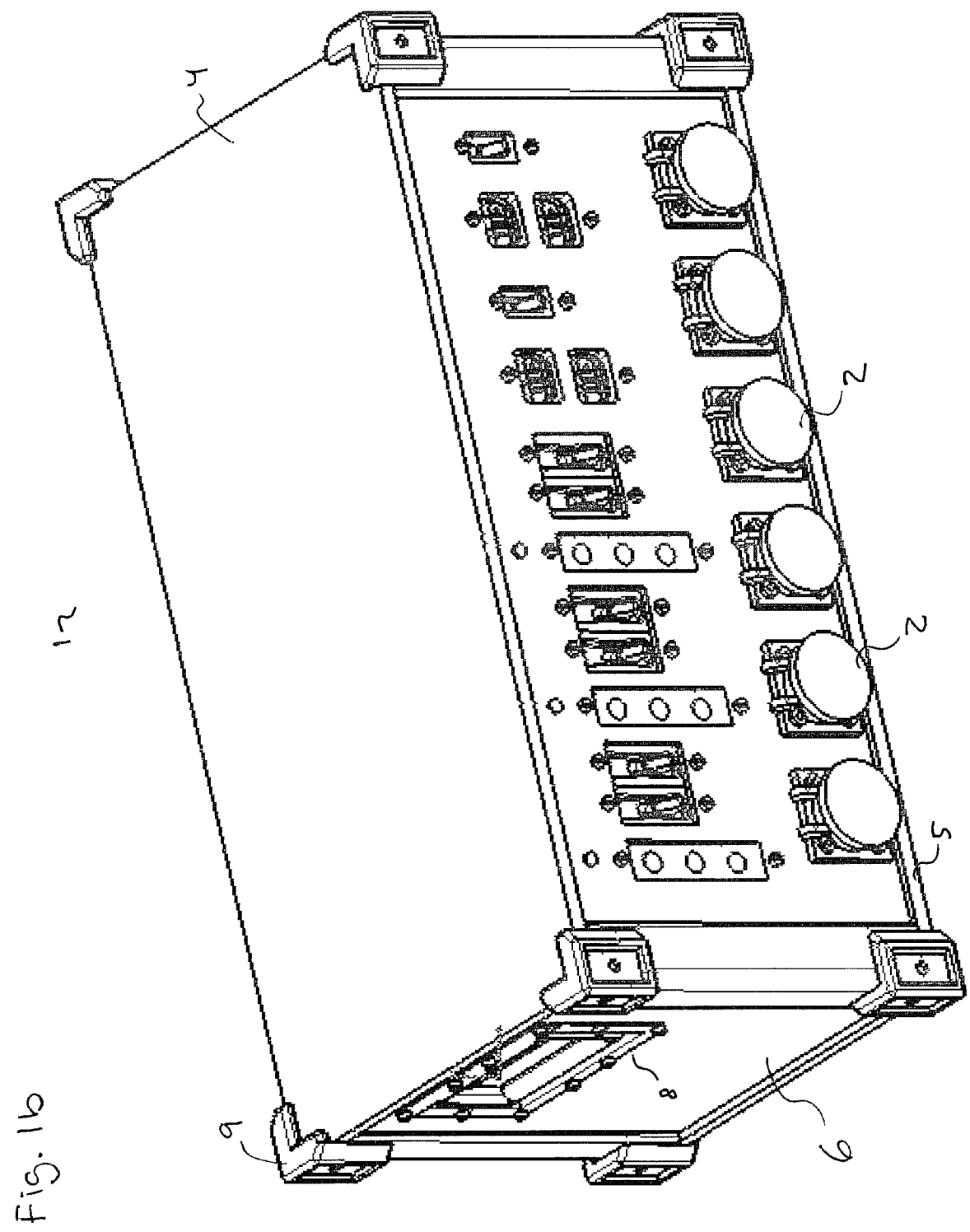
Figure 1C:
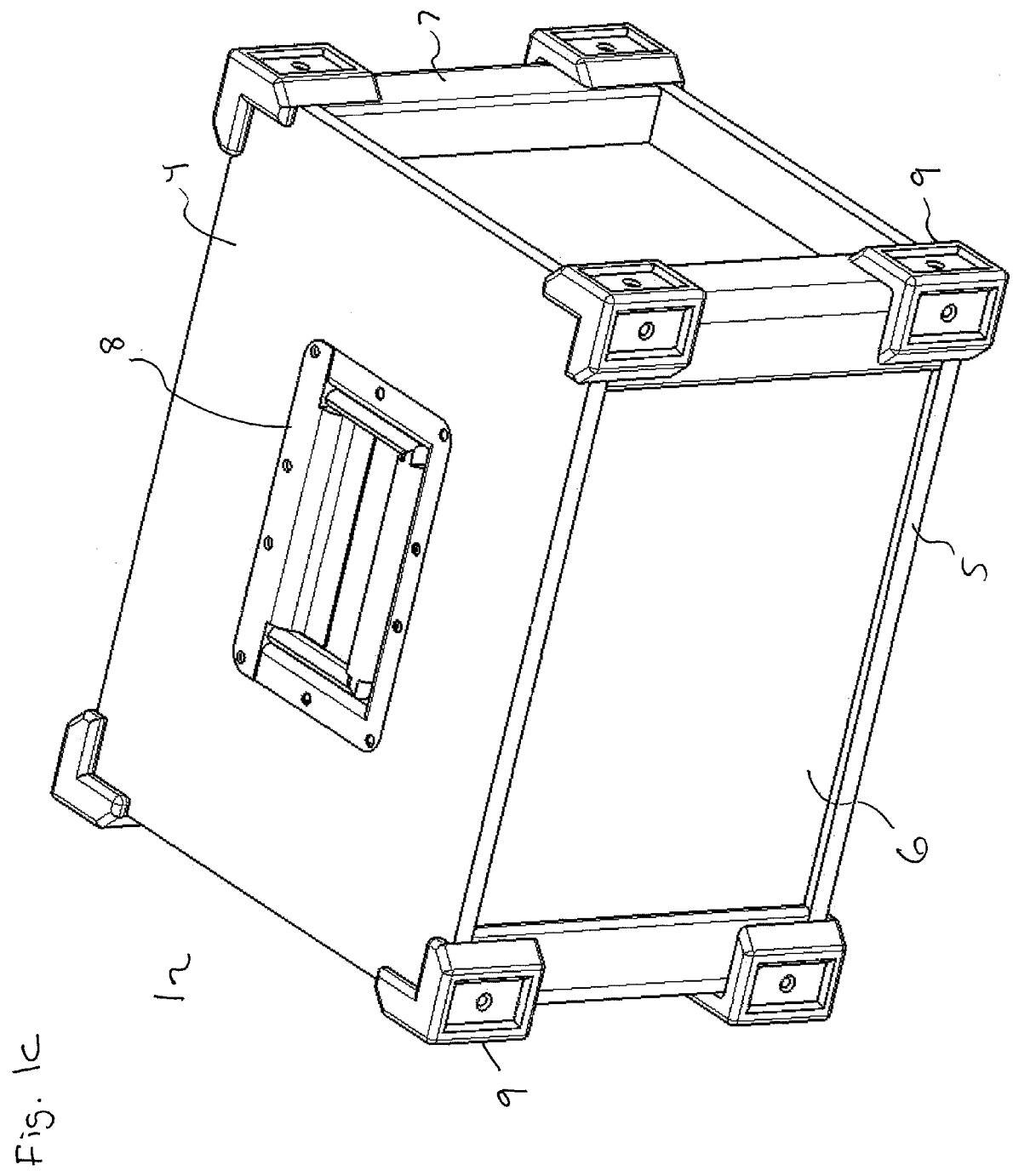

FIGS. 1a-c illustrate perspective views of different exemplary configurations of a power distribution box 1 that includes a plurality of inputs 2 for receiving a voltage and a plurality of outputs 3 for distributing the voltage or a lower voltage that is transformed by electrical components contained within the power distribution box 1. The power distribution box 1 is enclosed by an upper panel 4, a lower panel 5, and side panels 6. The upper panel 4, lower panel 5, and side panels 6 are removably arranged to one another via guide rails 7. In addition, a corner piece 9 may be provided, which can be fixedly secured to each corner to further protect the power distribution box 1.

The panels 4, 5, 6 provide a surface to attach electrical components and to protect the internal components from damage. Various electrical components, inputs 2, and outputs 3, can be mounted onto the panels in various configurations. These electrical components can include, for example, receptacles, LED's, breakers, camlocks, pin and sleeve connectors, 19 pin connectors, straight blade connectors, twistlock connectors, etc. In addition, one or more handles 8 for ease of portablility can be mounted onto one or more of the panels 4, 5, 6. Also, various components can be mounted to an interior side of the panels, such as wire guides.

Figure 2B:
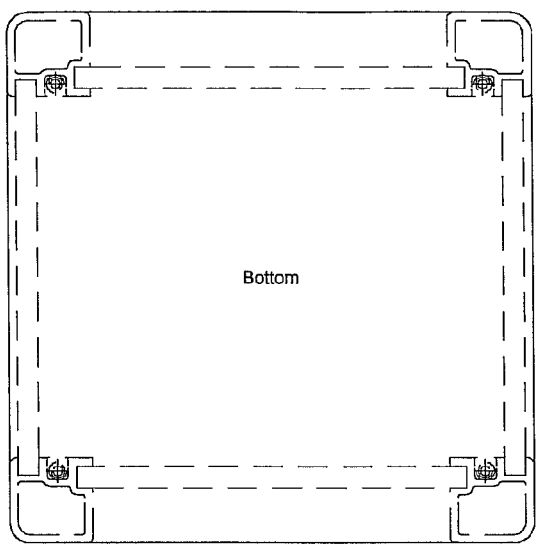
Figure 2C:
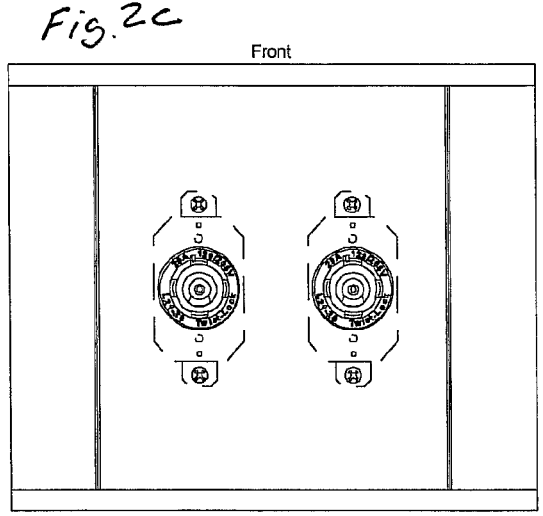
Figure 2D:
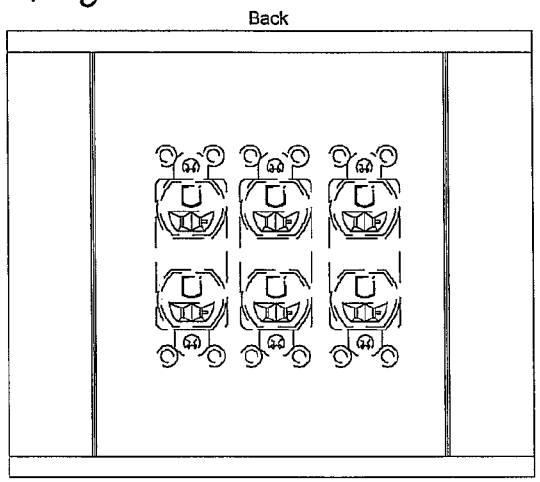
Figure 2E:
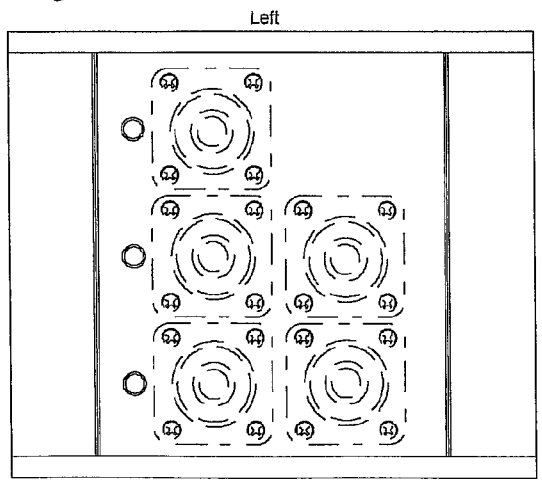
Figure 2F:
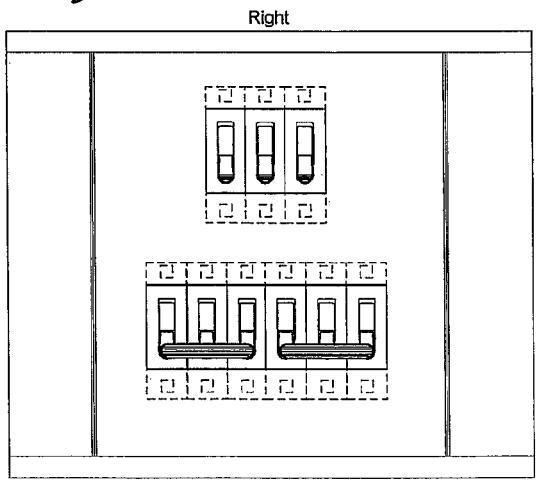

FIGS. 2a-f show side views of each side of the power distribution box 1. As can be seen, each of the panels 4, 5, 6 can be configured with various components in various arrangements. FIG. 2a is a top view that shows the handle 8 and also illustrates the protective corner pieces 9, which can be made of, for example, plastic or of a steel enhanced molded rubber. FIG. 2b is a bottom view that is shown without the optional corner pieces 9. FIG. 2b also illustrates the connection configuration between the panels 6 and the guide rails 7. It is noted that although a box shape is shown, e.g., four side panels 6 are shown, there can be three, five, or more side panels provided to thereby form various shapes, such a triangular, rectangular, pentagonal, etc.

FIGS. 3a-b illustrate the guide rail 7 in further detail. The guide rails 7 can be formed via compression molding, transfer molding, extrusion molding, injection molding, or any other technique known to one skilled in the art, and are formed such that they have insert slots 10 for receiving the panels 6. The insert slots 10 can be formed to extend completely along a longitudinal axis of the guide rails 7 or can also be formed to extend only along a portion of the guide rails 7. Further, the guide rails 7 can have a hollow interior 14 or a solid interior (not shown). It should be appreciated that a hollow interior 14 is preferred in that less material and thereby a weight and cost savings are achieved. In an embodiment, a protrusion 15 can be formed on an interior wall of the guide rail 7. This protrusion 15 strengthens the structural support of the guide rail 7 and also provides a material receiving area for receiving a screw that holds the corner piece 9 fixedly to the guide panel 7. Further, two parallel protrusions may be formed on the interior wall of the guide rail 7, each one being adjacent to an outer corner of the guide rail 7. Into at least one protrusion 15, a shaft of a threaded screw is screwed from the outside into the guide rail 7, for example, via hole 17, to affix a corner piece 9.

In the exemplary embodiment illustrated, four guide rails 7 are provided that fixedly hold the panels 6 at 90 degrees to one another. It is noted that the insert slots 10 can be formed at any degree towards one another, and that the shape of the top and the bottom panels 4, 5 can be adapted accordingly, to thereby provide different shapes as noted above, e.g. triangular. Furthermore, the guide rails 7 are configured such that the upper and lower panels 4, 5 can be fixedly secured to each end of the guide rails. The upper and lower panels 4, 5 can be fixedly and/or removably secured to the guide rails 7 by, for example, a screw that is screwed into hole 11. However, the panels 4, 5 can also be secured to the guide rails 7 by, for example, nails, glue, bolts, toggles, or any other fastening means known to one skilled in the art.

In order to protect the components that are mounted onto the panels 6, a distance a that is formed between an outer edge 12 and the slot 10 of the guide rail 7, as shown in FIG. 3b, can be increased based on a depth of the component such that the panels 6 can be recessed with respect to an outer edge 12 so that the electrical components are further protected from damage if, for example, the corner pieces 9 are not utilized.

Figures 4A, 4B, 4C:
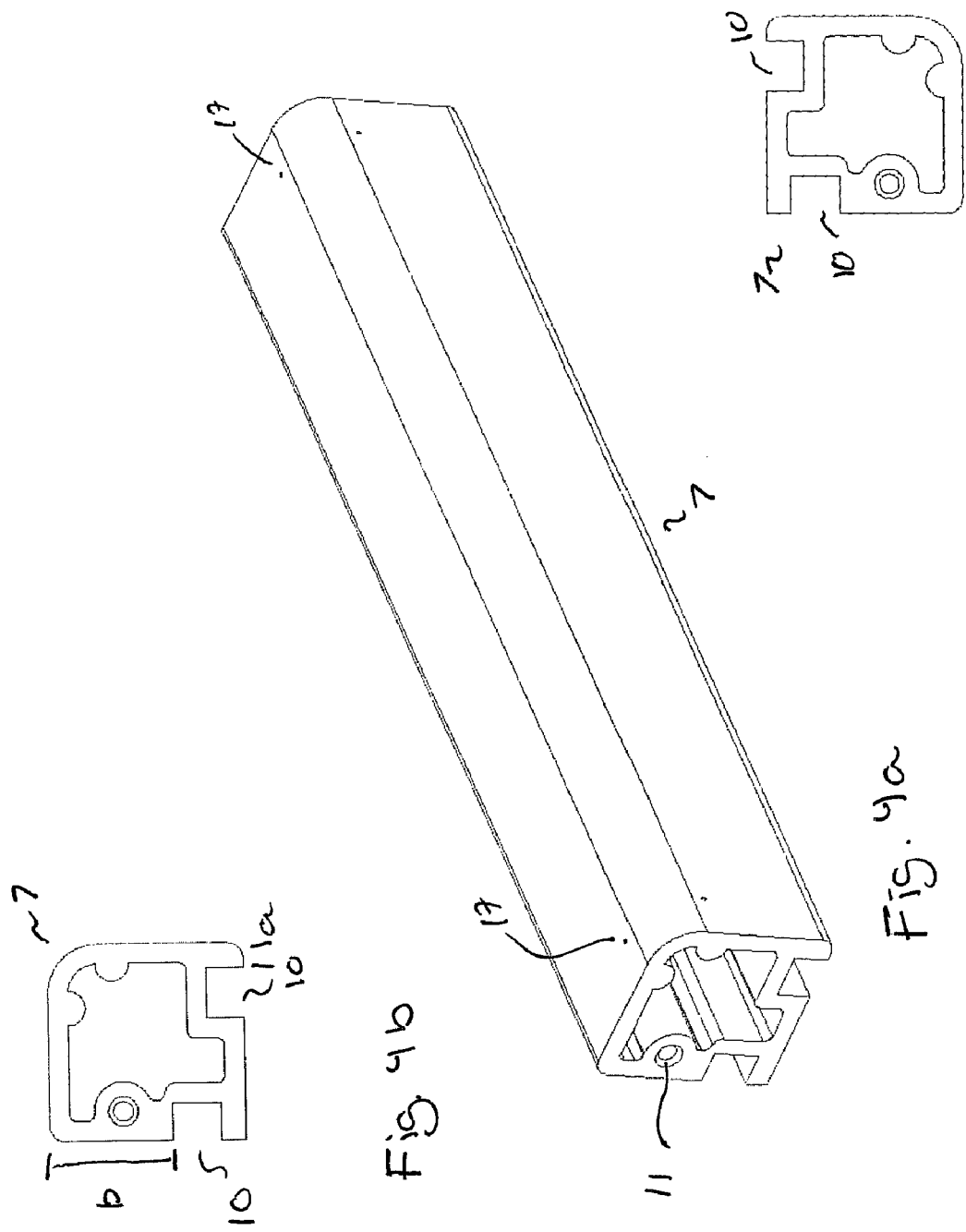
FIGS. 4a-c illustrate another embodiment of the guide rail according to the present invention.

FIGS. 4a-c illustrate another embodiment of the guide rail 7, whereby the insert slots 10 is displaced further from the outer corner of the guide rail to thereby also vary the distance b, which represents the distance from a surface of the panel 6 to the edge of the guide rail. Thus, it should be appreciated that by varying the distances a or b, various electrical components, such as receptacles with covers, are protected by the edges of the guide rails 7 and/or the corner pieces 9.

In an assembled state, the side panels 6, upper and lower panels 4-5 and the guide rails 7 form a secured box that prevents inadvertent access to the interior components and can be completely dissembled by removing, for example, eight screws. Likewise, for assembly purposes only eight fasteners, in an exemplary embodiment, are needed to secure all panels 4, 5, 6 of the power distribution box 1. Thus, a time for assembly and disassembly of the power distribution box 1 is greatly reduced. In addition, it should be appreciated that the power distribution box 1 can be easily configured to have various shapes and sizes. Further, the panels 4-6, guide rails 7, and edge pieces 9 can be formed of a material that is non-conductive, for example, a plastic or ceramic material.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A power distribution housing system comprising:
 an upper panel;
 a lower panel;
 a plurality of side panels; and
 a plurality of tubular guide rails each having at least two adjacent side surfaces extending along the longitudinal axis of said guide rails and oriented at 90 degrees to each other, with said at least two adjacent side surfaces having an insert slot formed therein that extends along said longitudinal axis of the guide rail, each of the insert slots being configured to receive and fixedly hold an edge of one of said side panels,
 wherein the upper panel and lower panel are each fixedly mounted to an opposite edge face of the guide rails thereby securing the side panels and guide rail between the upper panel and lower panel.

2. The power distribution housing system according to claim 1, wherein a handle is provided in the upper panel.

3. The power distribution housing system according to claim 1, wherein the side panels are provided with different electrical components, the electrical components including inputs, outputs, and/or circuit breakers.

4. The power distribution housing system according to claim 1, wherein the power distribution panel receives a voltage via an input provided on a side panel and distributes the voltage via an output provided on a side panel.

5. The power distribution housing system according to claim 1, wherein the upper panel, lower panel, the side panels or the guide rails are non-conductive.

6. The power distribution housing system according to claim 1, further comprising a corner piece for preventing damage to the power distribution panel.

7. The power distribution housing system according to claim 6, wherein the corner piece is removably secured to an edge corner of the power distribution panel.

8. The power distribution housing system according to claim 1, wherein the at least two insert slots are formed in the guide rail such that their respective openings are positioned at substantially 90 degrees to one another.

9. The power distribution housing system according to claim 1, wherein the power distribution housing system has four panels to thereby form a box shape.

10. The power distribution housing system according to claim 1, wherein for disassembly of an assembled power distribution housing system, four fasteners fixedly securing the upper panel to the guide rail and four fasteners securing the lower panel to the guide rail are removed.

11. The power distribution housing system according to claim 10, wherein the fasteners are screws or bolts.

12. The power distribution housing system according to claim 1, wherein the guide rail has a hollow interior.

13. The power distribution housing system according to claim 1, wherein an interior of the guide rail has at least one protrusion on an interior wall.

14. The power distribution housing system according to claim 13, wherein the protrusion formed on the interior wall of the guide rail is adapted to receive a fastener that fixedly holds a corner piece to an end of the guide rail.

15. A guide rail for a power distribution panel, the guide rail comprising:
 a tubular body;
 a first end face;
 a second end face;
 a first and second insert slot extending between the first end face and the second end face with each first and second insert slot respectively located in an adjacent side surface of said tubular body extending along a longitudinal axis of said tubular body, and said adjacent side surfaces oriented at 90 degrees to each other, the first and second insert slots each configured to receive a panel therein, the first end face and the second end face each being configured to fixedly attach an upper panel and a lower panel thereto, respectively, wherein the panels are configured to hold a plurality of inputs and outputs for distributing voltage.

16. The guide rail according to claim 15, wherein the guide rail is formed such that an interior thereof is hollow.

17. The guide rail according to claim 15, wherein an interior of the guide rail has at least one protrusion on an interior wall.

18. The guide rail according to claim 17, wherein the protrusion formed on the interior wall is adapted to receive a fastener that fixedly holds a corner piece to an end of the guide rail.

* * * * *